Nov. 30, 1926.
M. H. SENIOR
1,608,909
REVOLVING LIGHT FOR VEHICLES
Filed Feb. 23, 1926
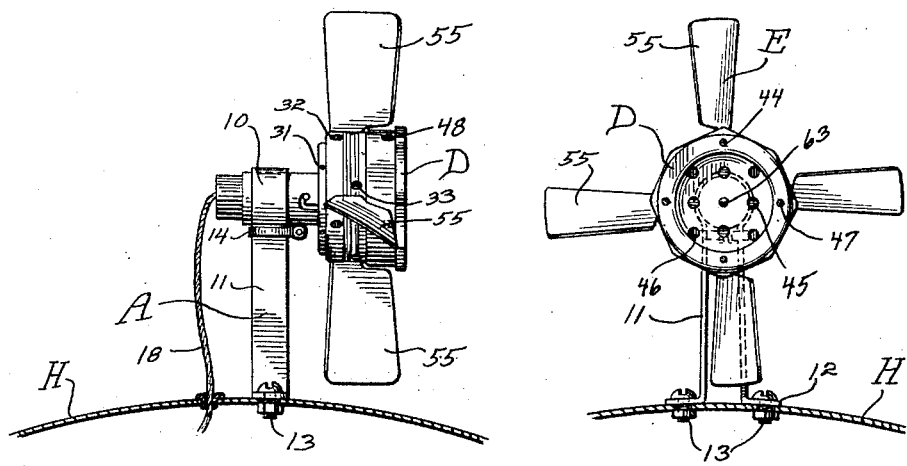
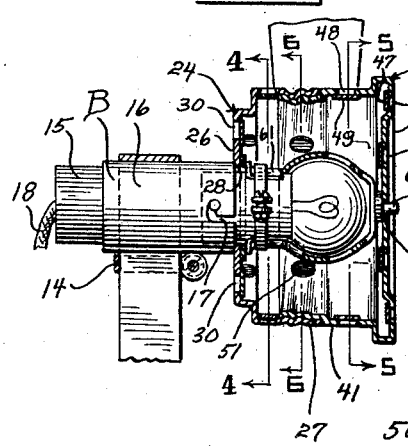
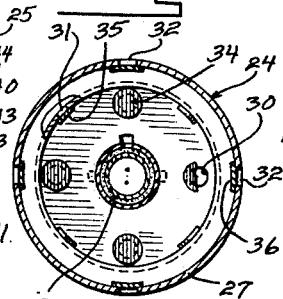
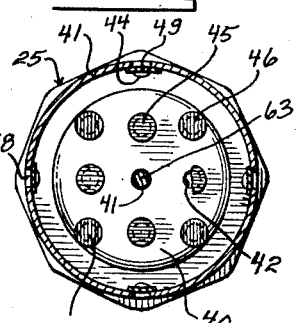
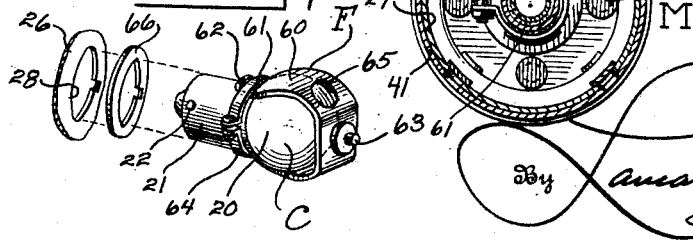
Milnor H. Senior
Inventor

Patented Nov. 30, 1926.

1,608,909

UNITED STATES PATENT OFFICE.

MILNOR H. SENIOR, OF WOODBRIDGE, NEW JERSEY.

REVOLVING LIGHT FOR VEHICLES.

Application filed February 23, 1926. Serial No. 90,169.

The present invention relates to lights for use upon motor vehicles or the like, and the primary object of the invention is to provide a revolving ornamental light actuated by the air currents created during travel of the vehicle.

A further object of the invention is to provide a revolving indicator light so constructed as to be visible from all angles, and which light when revolving will form a series of differently colored light beams.

A further object of the invention is to provide an improved revolving light which receives its source of illumination from an electric lamp, and which lamp serves as a support for the revoluble body forming a housing or casing for the electric lamp.

A further object of the invention is to provide a revolving indicator light particularly well adapted for indicating various bus routes, embodying a structure whereby the removable cap portion of the device embodies colored transparencies so arranged that when the device is illuminated and is revolving, concentric circles of differing colors will be projected, and which different arrangements of concentric circles of different colors may be utilized for designating certain bus routes.

Other objects and advantages of the invention will be apparent during the course of the following detailed description, taken in connection with the accompanying drawing forming a part of this specification and in which drawing—

Figure 1 is a side elevation of the improved light as shown supported upon a portion of a motor vehicle, the portion of the vehicle in the example shown representing a portion of one of the rear fenders of the vehicle.

Figure 2 is a face plan view of the light shown attached.

Figure 3 is an enlarged central vertical section through the lamp housing and showing the manner in which the housing is rotatably supported upon the lamp.

Figure 4 is a transverse section taken substantially on the line 4—4 of Figure 3 and looking in the direction of the arrows.

Figures 5 and 6 are sectional views taken on the respective lines 5—5 and 6—6 of Figure 3 and looking in the direction of the arrows.

Figure 7 is a perspective view of the lamp, showing the supporting yoke for mounting one end of the lamp housing, and fragmentary portions of the housing through which the base of the lamp extends.

Referring to the drawing in detail, and wherein similar reference characters designate corresponding parts throughout the several views, the letter A may designate a suitable supporting bracket, B a socket rigidly carried by the bracket A for detachably receiving an electric lamp C; D a casing or housing enclosing the electric lamp C, E means for imparting rotary motion to the housing D, and F means for pivotally mounting a portion of the housing D forwardly of the lamp C.

The supporting bracket A in the example shown, consists of a strip of metal bent intermediate its ends into circular formation as at 10, for providing a pocket for receiving the socket B, and providing spaced arms 11 having their lower portions bent at a right angle as at 12 and providing feet through which suitable fastening elements 13 may pass for rigidly securing the bracket to any suitable portion of the vehicle. This bracket A is preferably formed of a yieldable material, and a clamp 14 may be positioned about the upper end of the arms 11 for drawing the same together for firmly clamping the circular head portion 10 about the rear portion of the socket B. In the example shown, the supporting bracket has been shown secured to a portion of the fender H of a motor vehicle, and it is to be understood that this bracket may take different forms in accordance with the particular place it is desired to position the light upon the vehicle.

The socket B is of ordinary construction, and embodies the cylindrical body 15 about the forward end of which a tubular metal sleeve 16 is disposed, and which sleeve is provided at its forward end with the usual L-shaped pocket 17 opening at the forward end of the sleeve. This socket is preferably of the single contact type, a lead wire 18 being connected with the central contact point, and the metal sleeve 16 being grounded through the bracket A to the fender H.

The lamp C which is of the single contact type, embodies the evacuated bulb 20 and the base 21 provided adjacent its rear end with diametrically disposed pins 22 adapted for locking in the L-shaped slot 17 of the socket B. The base 21 which is adapted to slidably fit within the metal sleeve 16 of the socket B is formed with the usual metal casing through which current may pass from the sleeve to one terminal of the filament of the lamp.

Referring now to the casing or housing D, and which is preferably of cylindrical shape in formation, the same embodies separable inner and outer sections 24 and 25 respectively. Referring first to the inner section 24, the same is of substantially cup shape in formation, providing a disc shaped end wall 26 having a forwardly extending annular portion 27 formed at its peripheral edge. Provided axially of the end wall 26, is a round opening 28 of a diameter to loosely receive the base 21 of the lamp C, the base 21 serving as a bearing upon which the inner section may rotate. As will be seen in Figure 3, the outer face of the end wall 26 engages the forward end of the sleeve 16 for preventing lateral movement of the section 24 in one direction when the parts of the device are in assembled relation. Provided in the end wall 26, and arranged concentric to the axis thereof, is a plurality of apertures 30 while provided in the annular portion 27, are annular rows of apertures 31, 32 and 33. These annular rows of apertures extend from the inner to the outer end of the housing E, in the respective orders given. Secured inwardly of the section 24, and covering the respective apertures thereof, are disc shaped translucent members formed of glass, celluloid or other suitable material, and which discs may be secured to the inner side of the section as by cementing or the like. These discs are preferably of different colors, and in the example shown the discs 34 for closing the apertures 30 are red, the discs 35 for closing the apertures 31 blue, and the discs 36 for covering the apertures 32 red.

Referring now to the outer section 25, and which is also of cup shaped in formation, providing an end wall 40 and an annular portion 41 which is adapted for fitting within the annular portion 27 of the inner section 24. In the example shown, the sections 24 and 25 have their annular portions provided with threaded sections for threaded connection of the members 24 and 25, but if desirable a bayonet slot and pin arrangement may be provided for detachably connecting the sections together. Provided axially of the end wall 40, is an aperture 41 having a series of concentrically arranged apertures disposed in circular formation thereabout. Of the series of circular rows of apertures, 42 may designate the innermost row, 43 the next or intermediate row, and 44 the outermost row. These apertures 42, 43 and 44 may be covered by disks 45, 46 and 47 respectively colored blue, red, and green, and which disks are preferably cemented to the inner face of the end wall 40. Provided in the annular portion 41, is an outer annular row of apertures 48 covered by red disks 49, and an inner annular row of apertures 50 covered by a row of blue disks 51, the annular row of apertures 50 to align with the annular row of apertures 33 of the inner section 24 when the inner and outer sections are connected for forming the housing or casing D. Thus it will be seen that when the sections 24 and 25 are connected together for forming the casing D, the casing will have provided in its annular portion, annular rows of apertures through which different colored rays of light may shine, while each end wall of the casing will be provided with circular rows of concentrically arranged apertures thru which different colored rays of light may shine. It will be observed that when the sections 24 and 25 are in assembled relation, that the aperture 28 will be disposed in axial alignment with the aperture 41 of the outer section.

The means E for imparting rotary movement to the casing D, in the example shown consists of a series of radially extending angular blades 55 connected at their inner ends to the annular portion 27 of the inner section 24, and which blades preferably extend in overlying relation to the annular portion of the outer section 25 in order to provide a relatively large face for each blade. As will be observed in Figure 1, these blades 55 preferably lie wholly inward of the plane of the end walls 26 and 40 of the casing.

Referring now to the means F for rotatable mounting on the forward or outer end of the housing B, the same embodies a substantially U-shaped yoke, the arms 60 of which are oppositely bulged and extend forwardly in overlying relation to the bulb 20 of the lamp C. The rear portion of each of the arms 60 are arcuated transversely as at 61, and have their terminal ends bent outwardly for providing radial flanges 62. Carried by the forward or outer end of the yoke, is a bearing pin 63 of a diameter to fit within the aperture 41 of the outer casing section 25. The transversely arcuated portions 61 of the arms have their arc of curvature substantially equal to the arc of curvature of the base 21 of the lamp C, so that when the free ends of the arms are drawn into binding engagement with the lamp base 21 as by the ring shaped clamp 64, the pin 63 will be disposed in axial alignment with the axis of the lamp base 21. Apertures 65 may be provided in the arms 60 for allowing more rays of light from the lamp C to be directed to the colored apertures of the casing. A spacing washer 66 may be disposed about the lamp base 21 between the inner face of the end wall 26 and the radial flanges 62 for preventing any possible binding between the end wall and radial flanges. Thus it will be seen that the base 21 of the lamp serves as one support for the revoluble casing D, while the pin 63 serves as the other support for the casing.

In operation, and when the lamp C is illuminated, air currents striking the blades 55 will cause the casing D to rotate, and during which rotation the annular rows of apertures will create streaks of different colors at the annular portion of the casing while the circular rows of apertures at the end walls of the casing will form concentric circles of different colors.

Aside from providing a novel revolving ornamental light for vehicles, the light also forms a revolving indicator light particularly well adapted for designating various bus routes, and when serving as such, the colored disks may be rearranged so that various lighting effects will be formed during rotation of the lamp. When used for such a purpose, the housing D may be made relatively large and if desirable any suitable mechanical means may be employed for rotating the housing, but it is desirable that this rotation of the housing be caused by the action of wind currents upon the blades 55.

From the foregoing description it will be apparent that a novel type of revolving lights for vehicles has been provided which is neat in appearance, one wherein during rotation thereof various lighting effects will be created, and one wherein the cylindrical base portion of the electric lamp forming an illuminating medium for the light, serves as one of the supports for the revoluble body.

Changes in details may be made to the form of the invention herein shown and described, without departing from the spirit of the invention or the scope of the following claims.

I claim:

1. A device of the class described comprising a lamp casing embodying inner and outer sections, said sections having circular rows of apertures in their end walls and annular rows of apertures in their annular portions, and with the annular and circular rows of apertures covered by different colored transparencies, a lamp disposed within said casing, and radially extending angular blades carried by one of the sections for rotating the casing about the lamp by air currents acting upon the angular blades.

2. In a device of the class described the combination of a supporting bracket, a socket carried by the bracket, a lamp fitting in the socket and having a portion of its annular base portion extending outwardly of the socket, a lamp casing embodying inner and outer separable sections, the inner section being rotatably mounted upon the annular base portion of the lamp, a yoke embracing the annular base portion of the lamp and extending forwardly over the bulb thereof and having a pin formed at its forward end in axial alignment with the lamp base, said pin serving as a pivotal mounting for the outer base section, said sections being provided with spaced apertures covered with colored transparencies, and annular blades extending radially from the casing for imparting a rotary motion thereto upon action of air currents upon the blades.

3. In a revolving indicator light for vehicles, the combination of a socket adapted for horizontal mounting upon the vehicle, a lamp embodying an annular base portion fitting in said socket, a yoke secured to the lamp base and extending forwardly over the bulb thereof and having a pin carried by its forward end disposed coaxially of the lamp base, a lamp casing embodying an inner and outer section respectively rotatably mounted upon the lamp base and pin of the yoke, said sections having provided in their end faces annular rows of concentrically arranged apertures, said circular rows of apertures being covered by different colored transparencies, and means for imparting a rotary motion to the casing so that said circular rows of apertures will form concentric rings of different colors at the end walls of the casing.

4. In a device of the class described, the combination of a lamp casing embodying inner and outer separable sections, a lamp disposed in said casing and serving as a support upon which the casing may revolve, and radially extending angular blades carried by one of the sections for imparting a rotary motion to the casing upon action of air currents upon the blades.

REV. MILNOR H. SENIOR.